June 28, 1960 H. GELLING 2,942,709
REVOLUTION COUPLING FOR FAST RUNNING CALCULATING MACHINES
Filed April 23, 1956

Inventor

United States Patent Office 2,942,709
Patented June 28, 1960

2,942,709

REVOLUTION COUPLING FOR FAST RUNNING CALCULATING MACHINES

Helmut Gelling, Ulm (Danube), Germany, assignor to Walther Büromaschinen Gesellschaft m.b.H., Gerstetten, Wurttemberg, Germany Filed Apr. 23, 1956, Ser. No. 579,860

Claims priority, application Germany Apr. 28, 1955

1 Claim. (Cl. 192—28)

The invention relates to a coupling for calculating machines between a drive member constantly driven by a motor, and a driven member in the form of the main shaft of the driving mechanism of the machine, where the main shaft is to be driven in precise increments of one or more revolutions.

With known devices of this kind the driven member is driven abruptly out of its position of rest and is abruptly stopped in its position of rest in a like manner. With fast running machines considerable acceleration forces are consumed or liberated thereby which not only strain the material beyond measure but also cause very disturbing noises. A buffering of the drive shaft in its position of rest is not possible as movements of the shaft beyond this position may result in unintentional movements of parts of the machine.

It is known in the art that these drawbacks can be avoided such that the angular velocity of the driven part of the coupling is increasingly diminished shortly before the revolution end position is reached by shortening the length of connection of a coupling member between the driving and the driven part, seen in the direction of the driving movement. To this end the coupling member has according to the invention the form of a pawl cooperating with notches of the drive member and being mounted on a carrier which is movably located on a driven member, and being adjustable in such a way that the direction of the connection line between the fulcrum of the coupling pawl and its point of contact at the drive member will be changed in relation to the direction of drive. The carrier of the pawl cooperates with an adjustable lug located outside of the coupling such that, in the position of rest of the machine, it is retained against the action of a spring in a position in which the coupling pawl is lifted out of the coupling notches, while the carrier of the pawl, when released by the adjusting lug under the action of its spring moves the coupling pawl into engagement with the notches, effecting a displacing of the fulcrum of the pawl in relation to the point of application of the pawl at the notched drive member.

Figure 1:
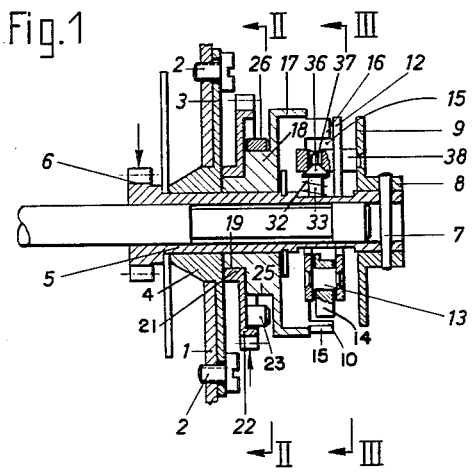
Figure 3:
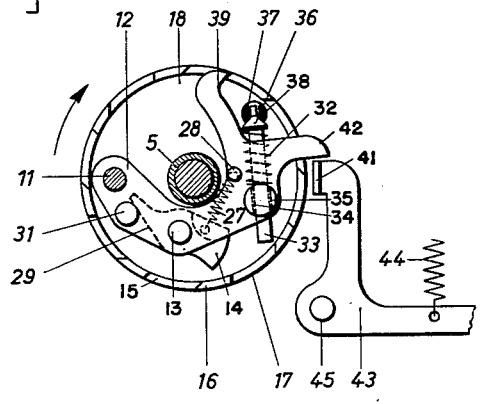
Figure 2:
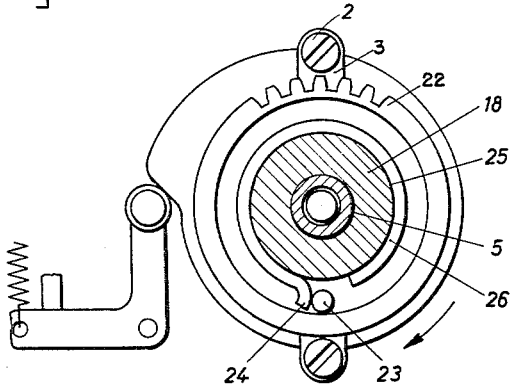
Figure 4:
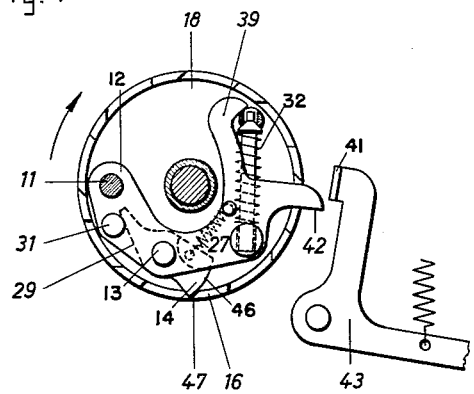
Figure 6:
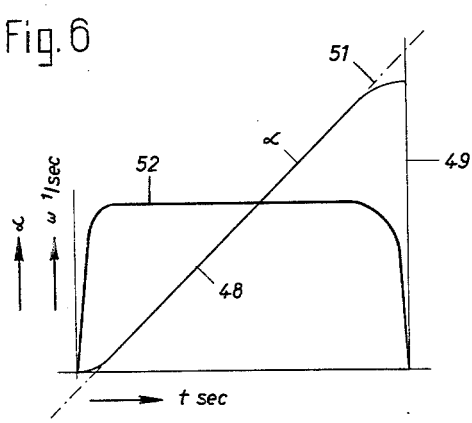
Figure 5:
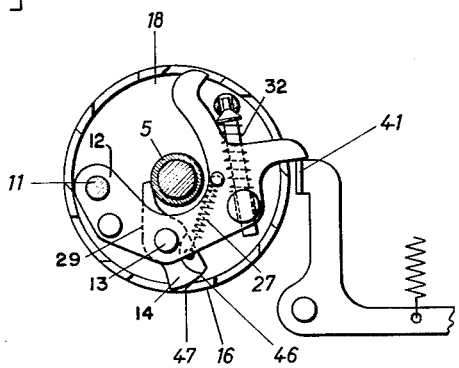

Further inventive features follow from the following description of an example of an embodiment of the invention. In the accompanying drawing:

Fig. 1 is a vertical axial section through the coupling.
Fig. 2 is a section taken in the line II—II of Fig. 1.
Fig. 3 is a section taken in the line III—III of the Fig. 1 in the position of rest of the coupling.
Fig. 4 is a view corresponding to Fig. 3 in the released condition of the coupling.
Fig. 5 is a view corresponding to Fig. 4 shortly before the coupling reaches the position of rest of the coupling.
Fig. 6 is a diagram of the time-way or time-angular velocity curve of the driven member.

On a side wall 1 (Fig. 1) of the machine is fixed a bearing shield 3 by means of screws 2 in the bearing bushing 4 of which a sleeve 5 is rotatably mounted carrying at its left end a drive toothed wheel being in mesh with the main shaft of the machine, while it is secured at its other end by a cross-bolt 7 to a hub 8 of a driven disc 9. The latter has a riveted bearing bolt 11 (Fig. 3) pivotally mounting a pawl carrier 12, on which a coupling-pawl 14 is fulcrumed by means of a pivot pin 13. The coupling pawl 14 cooperates with coupling teeth 16 formed by notches cut in a cylindrical circumferential wall 17 (Fig. 1) of a drive hub 18, being rotatably mounted on the sleeve 5. On a stepped circumferential face 19 of the drive hub 18 the hub 21 of a toothed drive wheel 22, connected to the motor shaft is loosely mounted. At the toothed wheel 22 a pin 23 is fixed which drives the drive hub 18 upon turning the toothed wheel 22 by means of a projection 24 (Fig. 2) of an open ring spring 26 pressed on a circumferential face 25 of the hub 18.

The coupling pawl 14 (Fig. 3) is under the constant action of a tension spring 27, which is attached to a pin 28 of the pawl carrier 12. Under the action of this spring the coupling pawl usually leans with a projection 29 against an abutment 31 of the pawl carrier.

The pawl carrier 12 is acted upon by a pressure spring 32, which is mounted on a spring bolt 33 guided at its one end in a bore 34 of a projection 35 fixed on the pawl carrier, and this spring bolt engages with a reduced part 36 of its other end a bore 37 of a pin 38 fixed to the driven disc 9. Under the action of the spring 32 the pawl carrier (Fig. 3) tends to rock in clockwise direction about the bolt 11, this rocking being limited by striking of a projection 39 (Fig. 4) of the carrier 12 against the pin 38.

Usually the pawl carrier 12 will be retained in its tensioned position by means of a switch-lug 41 (Fig. 3) located below a projection 42 of the pawl carrier 12. The switch lug 41 is fixed to a switch lever 43 influenced by a spring 44 and journalled by means of a pin 45 outside of the coupling. When the switch-lever 43 is moved in its releasing position shown in Fig. 4 the projection 42 will be released so that the pawl carrier 12 is enabled to move into the position represented in Fig. 4 under the action of the spring 32. The coupling pawl 14 thereby engages the coupling teeth 16 of the drive hub 18 which has previously been put in constant rotation by means of the motor driven toothed wheel 22 (Fig. 1), the pin 23 and the ring spring 26, whereby the pawl 14 with its end face 46 moves before the next lying coupling tooth 16 in a manner shown in Fig. 4 so that the pawl carrier 12 together with the driven disc 9 is driven at the angular velocity of the drive hub 18. The pawl 14 thereby receives a momentum in a counter clockwise direction about the pivot pin 13 by the cooperation of the reaction of the coupling force in the point of application 47 (Fig. 4) at the end face 46 with the spring force 27 as the direction of the coupling force passes above the axis of the pivot pin 13, in such a way that the pawl by means of its projection 29 remains in contact with the abutment 31. In this position of Fig. 4 the connecting line between the axis of pin 11 and the contact point 46 runs above the axis of pin 13. The action of the coupling force in contact point 46 which acts along the direction of the said connecting line tends to further break outwardly the toggle joint formed by the pawl 14 and the carrier 12 and the joint pin 13 until the projection 29 strikes pin 31, and projection 39 strikes pin 38. The toggle joint being one which can be broken towards both of its sides.

If the coupling is disconnected precisely at the end of one or more revolutions the switch lever 43 is rocked into its home position (Fig. 5) in which the switch lug 41 lies in the path of the projection 42 of the pawl carrier 12 so that the projection 42 shortly before the driven coupling part reaches its home position, strikes the switch lug 41 and is retained against the action of the spring 32. As a consequence, the pawl carrier 12 is rocked in the direction toward the sleeve 5 from the position shown in Fig. 4 to the position shown in Fig. 5, whereby the pivot pin 13 is accordingly moved away from the coupling teeth 16. This results in such a change of the direction of the reaction of the coupling force at the point of contact 47 that the pawl 14 now receives a clockwise momentum about its pivot pin 13, as the direction of the coupling force passes below the axis of the pivot pin 13 so that its projection 29 comes in contact with the sleeve 5 (Fig. 5). By this intermediate movement of the coupling pawl 14 the rotative movement of the pin 11 and the drive disc 9 will be slowed down. This retardation occurs gradually in the standstill of the driven disc 9 whereby the pawl carrier 12 strikes the sleeve 5 (Fig. 3). From the foregoing it will be evident that on the movement of the pawl carrier 12 from the retained (Fig. 3) to the released (Fig. 4) position the axis of the pivot 13 crosses the line running from the contact point 47 to the axis of the bearing bolt 11.

From the comparison of Figs. 4 and 5 it will be evident, that the angle of the center of the point of contact 47 and the axis of the pivot pin 13 is decreased and the distance of the two points seen in the taken-with direction is shortened thereby. By this shortening the rotation of the driven disc 9 remains behind that of the drive hub 18.

Fig. 6 shows in the curve 48 the displacement-time-curve of the rotation angle α of the driven part. Before reaching the home position 49 the growing of the angle decreases progressively in relation to the uniform increase of the angle of the driving part which is indicated by the dashed and dotted line 51. The curve 52 shows the course of the angular velocity which goes back to 0 in the end position of the revolution.

A corresponding formation of the curves also takes place at the beginning of the coupling interval. When the driving bush 18 which is driven by the driving wheel 22 by means of the pin 23 and the ring spring 26 (Fig. 2) suddenly engages the coupling pawl 14, a considerable impact is transmitted to the driving part of the coupling by virtue of the moment of inertia of the mass of the parts to be driven. The ring spring 26 thereby acts as a slipping coupling whereby the influence of the driving power to the machine mechanism increases gradually from zero as is shown by the beginning portions of the curves 48 and 52 (Fig. 6).

What I claim is:

In a disengaging device for revolution couplings of machines, a coupling drive part, a coupling driven part, a disc connected for rotation with said drive part having peripheral teeth, a bearing bolt rigidly secured with said driven part, a carrier pivotally mounted on said bearing bolt, a pivot pin secured to said carrier, a coupling pawl pivotally mounted on said pivot pin and cooperating with said peripheral teeth for coupling said drive part with said driven part, means for rocking said carrier from a released position in which said coupling pawl is in mesh with said drive part to a retained position in which it is out of mesh with said peripheral teeth, the parts of the carrier and the pawl between said bearing bolt, said pivot pin, and the contact point of the coupling pawl at the engaged teeth forming a toggle joint breakable towards both of its sides with the pivot pin as middle joint pin, said toggle joint being broken in the released position of the carrier towards the outer side of the connecting line between the axis of said bearing bolt and said contact point of the engaged pawl, the coupling force acting in the contact point holding the toggle joint in its outwardly broken position whilst said toggle joint is being broken in the retaining position of the carrier toward the inner side of said connection line whereby, on changing over the carrier from its released to its retained position after the axis of the pivot pin has crossed said connecting line, the velocity of the driven part will be gradually slackened to zero.

References Cited in the file of this patent
UNITED STATES PATENTS

| | | |
|---|---|---|
| 912,165 | Pike | Feb. 9, 1909 |
| 2,050,613 | Kellogg | Aug. 11, 1936 |
| 2,735,526 | Gemmel | Feb. 21, 1956 |
| 2,744,600 | Kohler et al. | May 8, 1956 |

FOREIGN PATENTS

| | | |
|---|---|---|
| 666,604 | France | May 27, 1929 |
| 603,328 | Germany | Sept. 27, 1934 |